Patented Aug. 3, 1926.

1,595,048

UNITED STATES PATENT OFFICE.

ROBLEY H. MORRISON, OF AKRON, OHIO, ASSIGNOR TO THE GOODYEAR TIRE & RUBBER COMPANY, OF AKRON, OHIO, A CORPORATION OF OHIO.

PROCESS OF MAKING A RUBBERIZED FIBER COMPOSITION.

No Drawing. Application filed August 28, 1920. Serial No. 406,651.

My present invention relates to a process for the manufacture of a material capable of many useful applications, such as for floor and wall coverings, as a substitute for leather, for containers of liquids or of moist materials and for other purposes to which a tough, flexible, waterproof body may be adapted. More specifically, my invention consists in treating fibers in such manner as to saturate and thoroughly impregnate them with a binding material, thereby rendering it possible to compact and mold the product to any degree and in any way desired. As such a binding material I may use rubber, gutta-percha or other substances of a like nature which may be vulcanized when heated with sulfur or other curing agents.

The fibers, which are capable of being treated according to the details of my process as hereinafter disclosed, should preferably be short but are not limited to any one kind or type. Thus, for example, I may use cotton, linen, hemp, manila, jute, asbestos, or wood fibers as prepared for paper making, or any felting material, such as hair or fur or other materials of a like nature. With fiber or mixture of fibers, I combine a substance, such as rubber, oil, or gum which may be readily dissolved and precipitated from its solution upon the fibers and which, furthermore, is susceptible to vulcanization with sulphur by heat or by any other suitable method. In this way, I obtain a product, all the fibers of which are apparently coated with the impregnating material and which is tough, flexible, waterproof and capable of being compressed and molded into any desired form and then vulcanized.

My preferred process for the manufacture of this composition is as follows: The fibers, preferably wood pulp fibers and particularly that brand known as sulphate "kraft" or that produced from wood by the well known sulphite or soda process, are beaten with a liquid in an ordinary beating engine of well known form or in any other similar machine used for a like purpose in the paper industry. The consequent disintegration should leave the material in a fibrous condition and particular care should be taken not to comminute or break down the fibers any more than is unavoidable in the process. As the liquid to be used in the beater with the pulp, I may use one that will serve as a solvent for or as a precipitating agent of the gum used. When rubber is used as the gum and is precipitated from a benzol or a gasoline solution, I prefer to use wood or denatured alcohol as the beating agent for the fibers. In the place of alcohol, I may use any liquid which is miscible with that added as a solvent or carrier of the gum or rubber. In order to obtain the best result, the pulp should be dried before being placed in the beater. This is advisable in order to prevent unnecessary dilution of the alcohol, or other liquid, which should always be avoided if a solvent miscible with water is used. The drying of the fibers would, of course, be unnecessary in case water be used as a beating agent.

The best conditions for the operation of my process are most quickly attained if not too large a proportion of fibers to liquid be taken. I have found that the most satisfactory results are obtained when the amount of fibers used is from 2% to about 8% of the weight of liquid taken. In any case, it must not be so large an amount that a thick mass of wetted fibers is produced but must form a fluid mixture in which the individual fibers may be separated from one another as completely as possible. The mixture is then beaten up until the mass of fiber is thoroughly disintegrated. There is now added to the mixture in a tank a sufficient quantity of rubber cement or other substance of the required properties to produce a material containing any desired proportion of rubber to the treated fiber which proportion I have found should be varied according to the ultimate requirements of the finished product. Thus, for a substitute for leather in the making of soles and heels I have found that a mixture of about 33% dry rubber and 67% dry pulp gives the best results, although other proportions will yield a material of high quality.

The treated fibers are agitated in the rubber solution for a period of time sufficient to thoroughly intermix and incorporate the materials together. The time required to accomplish this will, of course, vary according to the composition of the cement taken and the amount used. The solvents used for the cement and as a medium in beating up the pulp or other fibers should preferably be miscible with one another but one of them should be a non-solvent for rubber. By the use of such a combination of liquids, the rubber is precipitated on the fibers of the pulp or of any other fibrous material which it is desired to treat in this manner.

The rubberized fibers are then removed from the liquid mixture, by any desirable method, such as screening, and the liquids are allowed to drain away. The drying or removal of the liquids may be aided by means of pressure, which may be applied to the fibers in a mold. It is possible to shape the mass of rubberized fibers in any desired form and then to heat cure them under any desired or necessary pressure and temperature to vulcanize the rubber present and to form a compact mass which may be used for any desired purpose as hereinbefore mentioned.

The rubber cement which I prefer to use may be composed of any proportion of rubber and solvent that is desirable as well as practicable. The concentration of cement and the amount added will be decided by the qualities desired in the finished material. There is preferably some curing agent, such as sulfur, present in the cement, and there may or may not be added accelerators, filling agents, or compounding ingredients. Moreover, the time required to cure the finished material will vary according to the composition of the cement used.

It is to be understood that the proportion of rubber or gum that is mixed with the fibers in the making of my composition is an amount sufficient to bind together the fibers used and may or may not predominate in the mixture. It is an essential point in my invention that the rubber or gum is homogeneously distributed about the fibers as completely as possible and this result I accomplish by adding a solution or cement of rubber to the fibers suspended in some liquid in a comparatively loose state. Instead of following the process as outlined, it is also possible to obtain equally beneficial and, with some fibers, more desirable results, by beating the fibers in a solvent of rubber, such as benzol, adding the rubber cement and then precipitating the rubber on the fibers by the addition of a non-solvent of rubber, such as alcohol; or by beating the fibers in a solvent rubber cement and then precipitating the rubber on the fibers.

While I have described in more or less detail the specific steps of my process and have given particular solvents, chemicals or other reagents used in practicing the method, it will be understood that the claims hereto appended define the invention and I do not mean to be limited in any way except by them. Furthermore, my invention is not to be regarded as dependent on the soundness or accuracy of any theories herein propounded.

What I claim is:

1. The process of treating fibers which comprises suspending the fibers in a rubber solvent, adding thereto a solution of rubber, precipitating the rubber on the fibers, removing the fibers, and vulcanizing the product.

2. The process of treating fibers which comprises agitating the fibers in a rubber solvent, adding thereto a solution of rubber, precipitating the rubber on the fibers, removing the fibers, and vulcanizing the product.

3. The process of treating fibers which comprises suspending the fibers in a rubber solvent, agitating the materials to effect relative separation of the fibers, adding a solution of rubber thereto, precipitating the rubber on the fibers, removing the fibers, and vulcanizing the product.

4. The process of treating fibers which comprises suspending the fibers in a rubber solvent, mixing a rubber solution therewith, adding a precipitating agent, removing the fibers, and vulcanizing.

5. The process of treating fibers which comprises drying the fibers, suspending the fibers in a rubber solvent, mixing a rubber solution therewith, adding a precipitating agent, removing the fibers, and vulcanizing the product.

6. The process of treating fibers which comprises drying the fibers, suspending the fibers in a rubber solvent, mixing a rubber solution therewith, adding a precipitating agent, removing the fibers, drying the treated fibers, and vulcanizing the resulting product.

7. The process of treating fibers which comprises suspending the fibers in benzol, adding a colloidal solution of rubber thereto, precipitating the rubber on the fibers, removing the fibers from the liquid, and vulcanizing the product.

8. The process of treating fibers which comprises separating the individual fibers by agitation in a solvent of rubber, adding thereto a solution of rubber, precipitating the rubber on the fibers by adding a non-solvent of rubber, removing the fibers, and vulcanizing the product.

9. The process of treating fibers which comprises separating the individual fibers by agitation in a solvent of rubber, adding thereto a solution of rubber, precipitating the rubber on the fibers by adding a non-solvent of rubber, removing the fibers, drying the fibers, and vulcanizing the resulting product.

10. The process of treating fibers which comprises separating the individual fibers by agitation in a solvent of a vulcanizable gum, adding thereto a solution of a vulcanizable gum, precipitating the gum on the fibers by the addition of a non-solvent of the vulcanizable gum, removing the fibers from the liquid, and vulcanizing the product.

11. The process of treating fibers which comprises beating the fibers in a rubber solvent, adding a rubber solution thereto, precipitating the rubber on the fibers, removing the treated fibers, and vulcanizing the product.

12. The process of treating fibers which comprises mixing fibers and a rubber solvent in such quantities that the fibers constitute from 2 to 8 per cent of the weight of solvent, beating the fibers in the mixture, adding a solution of rubber to the mixture, precipitating the rubber on the fibers, removing the treated fibers, and vulcanizing the product.

13. The process of treating fibers which comprises mixing fibers and a rubber solvent in such quantities that the fibers constitute from 2 to 8 per cent of the weight of solvent, beating the fibers in the mixture, adding a solution of rubber to the mixture, adding a non-solvent of rubber to precipitate the rubber from its solution on the fibers, removing the treated fibers, drying and vulcanizing the resulting product.

14. The process of treating fibers which comprises beating the fibers in a rubber solution, adding a precipitating agent to effect a deposition of the rubber on the fibers, removing the treated fibers from the liquid, and vulcanizing the product.

15. The process of treating fibers which comprises beating them in a liquid, suspending them in a rubber solution, agitating the mixture to disperse the fibers through the solution, and precipitating the rubber upon the fibers.

16. The process of treating fibers which comprises beating them in a liquid, intermixing the fibers with a rubber solution, precipitating the rubber upon the fibers, separating the fibers upon which the rubber has been precipitated from the solution and vulcanizing.

17. The process of treating fibers which comprises beating them in a liquid, intermixing the fibers with a rubber solution, precipitating the rubber upon the fibers, separating the fibers upon which the rubber has been precipitated from the solution, shaping the fibers and finally vulcanizing.

In witness whereof, I have hereunto signed my name.

ROBLEY H. MORRISON.